(12) United States Patent
Echter et al.

(10) Patent No.: US 10,968,867 B2
(45) Date of Patent: Apr. 6, 2021

(54) PURGING NATURAL GAS COMPRESSORS

(71) Applicant: ONBOARD DYNAMICS, INC., Bend, OR (US)

(72) Inventors: Nicholas Paul Echter, Fort Collins, CO (US); Kristina Weyer-Geigel, Yakima, WA (US)

(73) Assignee: ONBOARD DYNAMICS, INC., Bend, OR (US)

( * ) Notice: Subject to any disclaimer, the term of this patent is extended or adjusted under 35 U.S.C. 154(b) by 0 days.

(21) Appl. No.: 16/493,644

(22) PCT Filed: Mar. 28, 2018

(86) PCT No.: PCT/US2018/024809
§ 371 (c)(1),
(2) Date: Sep. 12, 2019

(87) PCT Pub. No.: WO2018/183474
PCT Pub. Date: Oct. 4, 2018

(65) Prior Publication Data
US 2020/0018262 A1    Jan. 16, 2020

Related U.S. Application Data

(60) Provisional application No. 62/480,261, filed on Mar. 31, 2017.

(51) Int. Cl.
| | |
|---|---|
| *F02B 33/06* | (2006.01) |
| *F04B 17/00* | (2006.01) |
| *F02M 21/02* | (2006.01) |
| *F02B 43/10* | (2006.01) |

(Continued)

(52) U.S. Cl.
CPC ......... *F02M 21/0242* (2013.01); *F02B 33/06* (2013.01); *F02B 43/10* (2013.01); *F02M 21/0215* (2013.01); *F02M 21/0245* (2013.01); *F02M 35/10216* (2013.01);
(Continued)

(58) Field of Classification Search
CPC ........... F02M 21/0242; F02M 21/0215; F02M 21/0245; F02M 35/10216; F02B 43/10; F02B 2043/103; F02B 33/06; F04B 17/00; F04B 17/05; F04B 17/06
See application file for complete search history.

(56) References Cited

U.S. PATENT DOCUMENTS

| | | |
|---|---|---|
| 3,204,859 A | 9/1965 | Crooks |
| 5,400,751 A | 3/1995 | Grimmer et al. |
| 2007/0079778 A1 | 4/2007 | Atkinson et al. |

(Continued)

OTHER PUBLICATIONS

International Search Report and Written Opinion issued on International Application No. PCT/US2018/024809, dated Jun. 1, 2018, 7 pages.

*Primary Examiner* — Jacob M Amick
(74) *Attorney, Agent, or Firm* — Leber IP Law; Shelly M. Fujikawa

(57) ABSTRACT

When a natural gas compressor completes its compression cycle, residual pressurized natural gas remains in the cylinders, valves, and conduits of the compressor. Gas leaks into the environment increasing greenhouse gas emissions and introducing safety concerns. The systems and methods herein provide ways for substantially reducing or eliminating leakage of natural gas to the atmosphere while the system sits idle between compression cycles.

17 Claims, 4 Drawing Sheets

(51) Int. Cl.
*F02M 35/10* (2006.01)
*F04B 17/05* (2006.01)

(52) U.S. Cl.
CPC .............. *F04B 17/00* (2013.01); *F04B 17/05* (2013.01); *F02B 2043/103* (2013.01)

(56) References Cited

U.S. PATENT DOCUMENTS

2014/0238327 A1    8/2014  Hagen et al.
2014/0356196 A1*  12/2014  Moore .................... F04B 27/04
                                                              417/243

* cited by examiner

PURGING NATURAL GAS COMPRESSORS

STATEMENT REGARDING FEDERALLY SPONSORED RESEARCH OR DEVELOPMENT

This invention was made with government support under DE-AR0000490 awarded by the U.S. Department of Energy. The government has certain rights in the invention.

BACKGROUND

Natural gas is an attractive fuel for vehicles due to its low cost and reduced emissions, including greenhouse gases. However, for effective use as a vehicle fuel, natural gas must be compressed to high pressure (typically around 4000 psi).

FIG. 1 is a schematic for a four cylinder gas compression system to compress natural gas for vehicle fuel. The gas compressor (shown collectively as cylinder head 24 and a plurality of compression cylinders 10 in FIG. 1) is part of an internal combustion engine 2 containing the plurality of compression cylinders 10, at least one standard combustion cylinder 4 to drive the plurality of compression cylinders 10, and a common crankshaft 6 coupling the plurality of compression cylinders 10 and the at least one standard combustion cylinder 4. The plurality of compression cylinders 10 are in fluid communication with each other, and are configured to compress gas in a series of stages. The plurality of compression cylinders 10 includes an initial compression cylinder 12 in fluid communication with a gas inlet 14, a final compression cylinder 16 in fluid communication with a gas outlet 18, and optional intermediate compression cylinders, such as intermediate compression cylinders 20 and 22. A cylinder head 24 includes a valve system 26 to direct the flow of gas into and out of the compression cylinders. The flow of gas into a compression cylinder may be regulated using a check valve, e.g., check valve 28. The flow of gas out of a compression cylinder may be regulated using a check valve, e.g., check valve 30. Pressure regulator 54, disposed between gas inlet 14 and initial compression cylinder 12, ensures that the gas pressure from gas inlet 14 does not exceed the design limits for the maximum inlet pressure of initial compression cylinder 12.

As shown in FIG. 1, during a gas compression cycle, gas travels from gas inlet 14 to initial compression cylinder 12 via a conduit 32 passing through regulator 54 and check valve 28. Initial compression cylinder 12 compresses the gas. Compression of the gas causes the gas to heat. Check valve 30 allows the heated compressed gas to flow out of initial compression cylinder 12. As the heated gas passes to another compression cylinder for further compression via a conduit, e.g., compression cylinder 20 via conduit 34, a cooling system, e.g., cooling system 36, cools the gas. Cooling the gas reduces the energy required for compression. The gas is serially compressed via optional intermediate compression cylinders 20 and 22 until the gas leaves final compression cylinder 16, is cooled, and travels to gas outlet 18. U.S. Pat. No. 5,400,751, incorporated by reference herein, provides further details regarding natural gas compressors.

The gas compressor remains filled with pressurized residual natural gas at the end of a gas compression cycle. The natural gas may leak to the environment when the compressor sits idle because compressor valves do not seal completely, imperfect seals in the compression cylinders leak the gas, and high pressure leaking back through the compressor may cause pressure relief devices to trigger in lower stages. Having the compressor at pressure while idle is also problematic because it is difficult to restart the compressor under high pressure loads.

Thus, some compressors are designed to have a blowdown system in which the pressurized gas in the gas compressor at the end of a compression cycle is discharged to a blowdown tank and stored to be recompressed on the next cycle. FIG. 2 is a schematic for a four cylinder gas compression system including an integrated blowdown tank 38. As shown in FIG. 2, a blowdown tank 38 is in fluid communication with final compression cylinder 16. Blowdown tank 38 may also be in fluid communication with initial compression cylinder 12. An actively actuated valve 40 between final compression cylinder 16 and blowdown tank 38 regulates the flow of gas between these two vessels. An actively actuated valve 42 between initial compression cylinder 12 and blowdown tank 38 regulates the flow of gas between these two vessels. Pressure regulator 56 may be set to a pressure slightly above, e.g., 1 psi above, the gas pressure after regulation by pressure regulator 54. For example, if the gas pressure is 20 psi after regulation by pressure regulator 54, pressure regulator 56 may be set to 21 psi.

According to FIG. 2, valve 40 is closed during a gas compression cycle while valve 42 may remain open. After a compression cycle to use blowdown tank 38, valve 42, the gas inlet valve (not shown), and the gas outlet valve (not shown) are closed. Valve 40 is opened allowing the gas compressor pressure to vent into lower pressure blowdown tank 38 and the engine is shut off. After the pressure is equalized between the gas compressor (shown collectively as cylinder head 24 and compression cylinders 10 in FIG. 2) and blowdown tank 38, valve 40 is then closed while the gas compressor sits idle. To start the next compression cycle, the engine is started and valve 42 is opened followed by opening the gas inlet valve (not shown) and the gas outlet valve (not shown). Pressure regulator 56 ensures that gas is drawn from blowdown tank 38 until the pressure in blowdown tank 38 reaches the pressure set by pressure regulator 56 and then gas is drawn from gas inlet 14.

However, even after venting to the blowdown tank, the gas compressor remains at a pressure higher than ambient, and thus natural gas leaks into the environment. Leakage not only increases greenhouse gas emissions, but may also introduce safety concerns. What is needed is a mechanism to avoid such undesirable effects.

SUMMARY

The present invention provides several systems and methods to substantially reduce or nearly eliminate leakage of natural gas to the atmosphere while the gas compressor sits idle between compression cycles.

An exemplary gas compression system includes (a) a gas compressor including (i) a plurality of compression cylinders in fluid communication with each other and configured to compress a gas in a series of stages, including an initial compression cylinder in fluid communication with a gas inlet and a final compression cylinder in fluid communication with a gas outlet; and (ii) a cylinder head including a valve system to direct a flow of the gas into and out of the compression cylinders; and (b) a pump system configured to remove residual gas from the gas compressor after a compression cycle.

This gas compression system may further include (c) a blowdown tank in fluid communication with the final compression cylinder; and (d) a valve between the final compression cylinder and the blowdown tank; where the pump system includes (1) a blowdown assist pump disposed between and in fluid communication with the final compression cylinder and the blowdown tank; and (2) a check valve to admit gas passively to the blowdown tank and to prevent back flow of gas into the plurality of compression cylinders.

An example of a method of removing residual gas from a gas compressor after a compression cycle includes using the system above to create a low pressure in fluid communication with the final compression cylinder to remove the residual gas after the compression cycle, where the pressure of the gas compressor after creating the low pressure is reduced to less than 500 psi. Creating the low pressure may include opening the valve between the final compression cylinder and the blowdown tank; and turning on the blowdown assist pump to remove the gas from the gas compressor.

Another example of a gas compression system includes (a) a gas compressor including (i) a plurality of compression cylinders in fluid communication with each other and configured to compress a gas in a series of stages, including an initial compression cylinder in fluid communication with a gas inlet and a final compression cylinder in fluid communication with both a gas outlet and an engine intake manifold of an internal combustion engine; and (ii) a cylinder head including a valve system to direct a flow of the gas into and out of the compression cylinders; and (b) a valve disposed between the final compression cylinder and the engine intake manifold of the internal combustion engine.

Another method of removing residual gas from a gas compressor after a compression cycle includes using the above system to create a low pressure in fluid communication with the final compression cylinder to remove the residual gas after the compression cycle, where the pressure of the gas compressor after creating the low pressure is reduced to less than 500 psi. Creating the low pressure may include opening the valve between the final compression cylinder and the engine intake manifold; and creating a low pressure at the engine intake manifold by running the internal combustion engine.

DETAILED DESCRIPTION

Purging the gas compressor of residual gas prevents this gas from entering the environment. Several techniques to purge the gas compressor of residual gas include using a blowdown assist pump to pump the residual gas into a blowdown tank and pumping the residual gas through the engine intake manifold to be burned.

Figure 1:
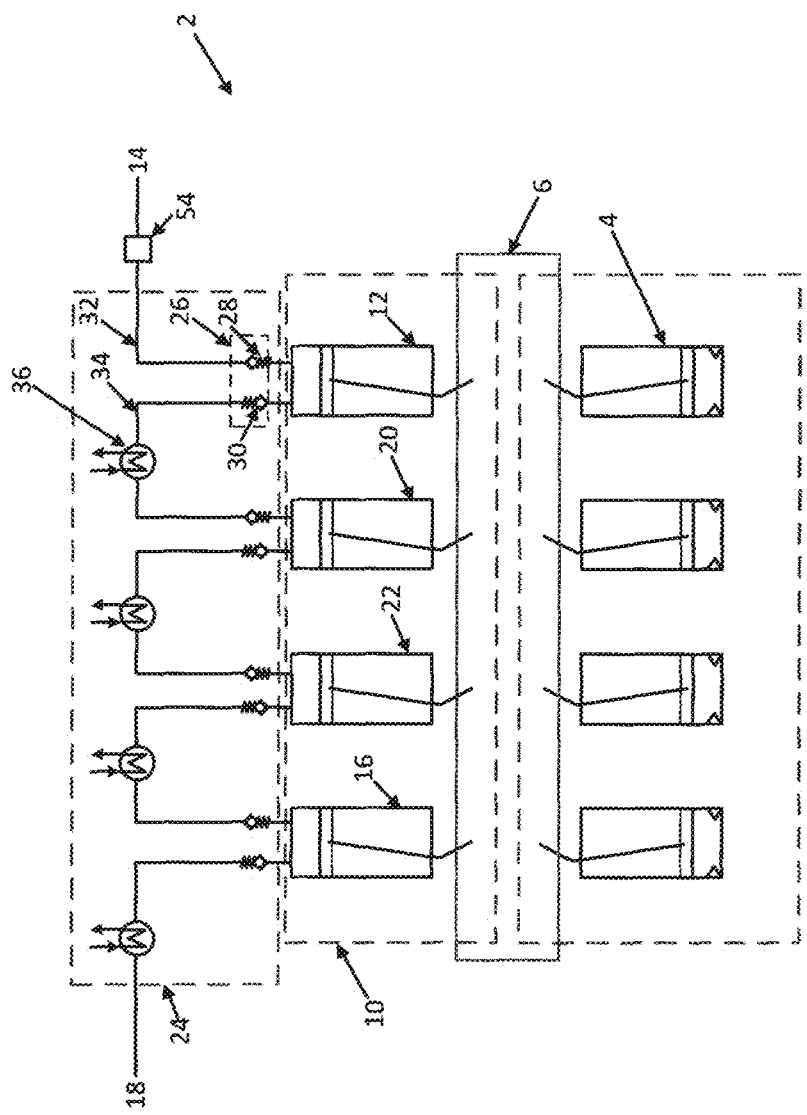
FIG. 1 is a schematic for a known four cylinder gas compression system.

The term "compression cycle" means the period starting when gas enters inlet 14 as shown in, e.g., FIG. 1 and ending when at least one combustion cylinder 4 stops, i.e., the engine stops.

The term "residual gas" means the gas remaining in the gas compressor including, but not limited to, gas within the cylinders, valves, and conduits at the end of the compression cycle. The pressure of residual gas is the pressure of the gas compressor at the end of the compression cycle and may be between the pressure in the blowdown tank, for example, 1 psi above the inlet pressure, and 5000 psi. The pressure of residual gas in the compressor may be, for example, from 1000 psi to 5000 psi, from 2000 psi to 4000 psi, or from 3000 psi to 3600 psi, or any other such range depending upon the desired pressure at which the system shuts down.

The term "blowdown tank" means a vessel that may store gas between compression cycles. The volume of blowdown tank 38 is chosen based on the volume of the natural gas lines and displacement of the compression cylinders of a particular design, but may be less than or equal to 6 gallons, less than or equal to 3 gallons, or less than or equal to 1 gallon. The blowdown tank may be U.S. Department of Transportation approved, chosen based on cost and space constraints, and rated at 3600 psi.

The term "blowdown assist pump" means a pump that removes residual gas from the gas compressor. The blowdown assist pump may be an electric pump, e.g., powered by battery, operating, for example, from less than 1 psi to 500 psi, from 10 psi to 500 psi or from 10 psi to 200 psi. The pump may be of any design compatible with this pressure range, but most commonly would be a positive displacement design such as a piston pump.

Figure 2:
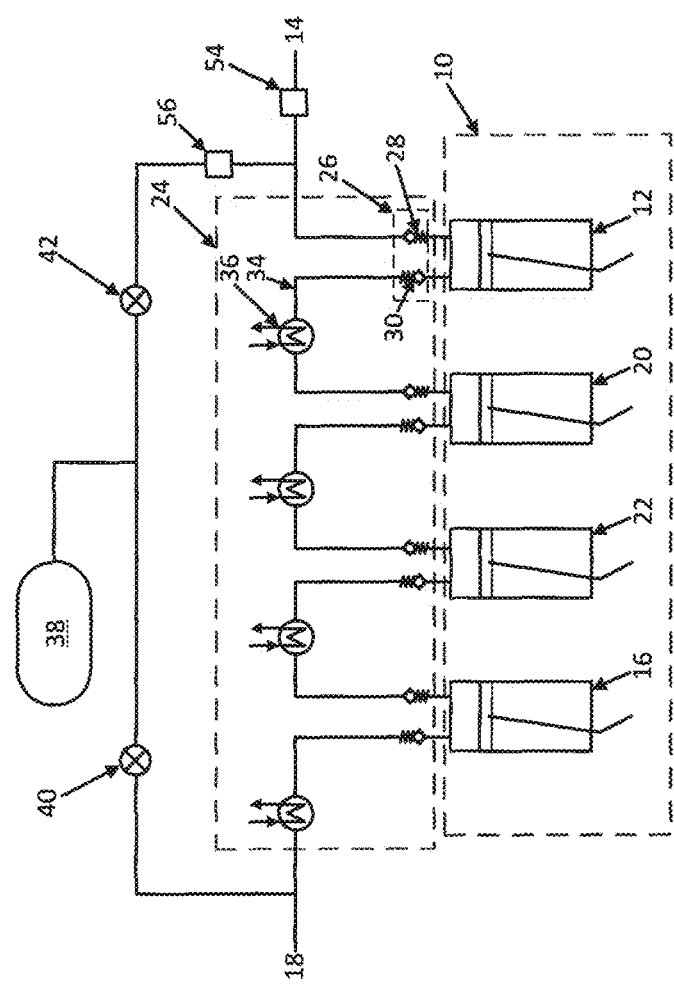
FIG. 2 is a schematic for a known four cylinder gas compression system including an integrated blowdown tank.

Gas Compressor Configurations and Methods for Removing Residual Gas from a Gas Compressor After a Compression Cycle In accordance with the present invention, systems and methods for removing residual gas from a gas compressor after a compression cycle rely on creating a low pressure in fluid communication with final compression cylinder 16 at the end of a compression cycle. As a result, the pressure in the gas compressor drops. By way of the present invention, the pressure in the gas compressor, after creating the low pressure, is further reduced as compared to the prior art as depicted, e.g., in FIG. 2. The pressure in the gas compressor, after creating the low pressure, may be reduced to a low pressure less than 1 psi, less than 5 psi, less than 10 psi, less than 20 psi, less than 50 psi, less than 100 psi, less than 150 psi, less than 200 psi, less than 300 psi, or less than 500 psi.

Figure 3:
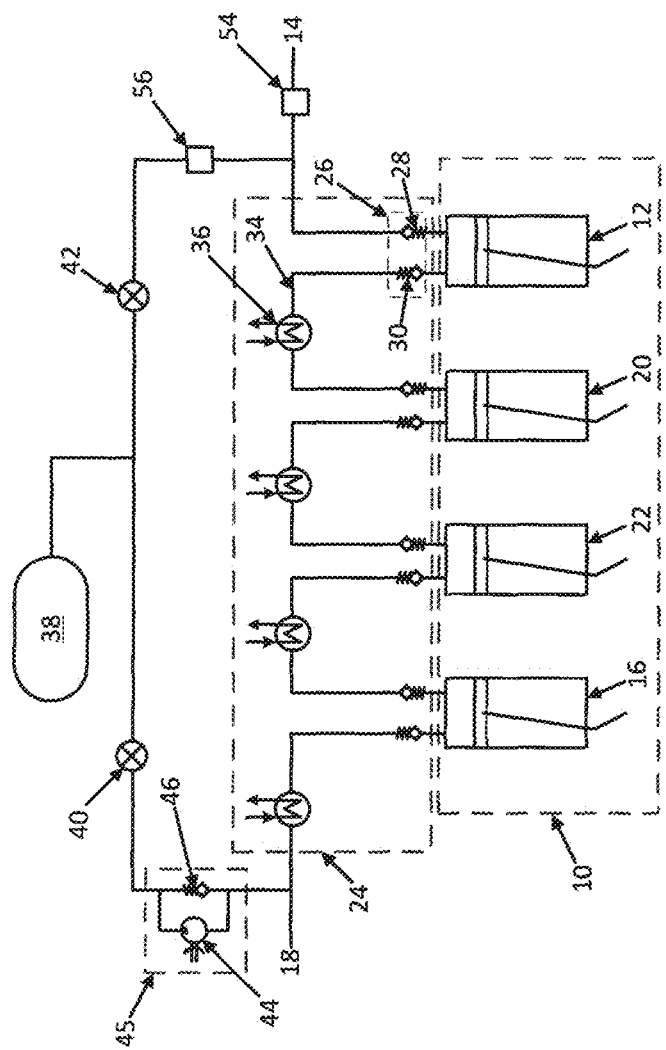
FIG. 3 is a schematic for a four cylinder gas compression system in accordance with the present invention including an integrated blowdown tank and a pump system directed to the blowdown tank.
Figure 4:
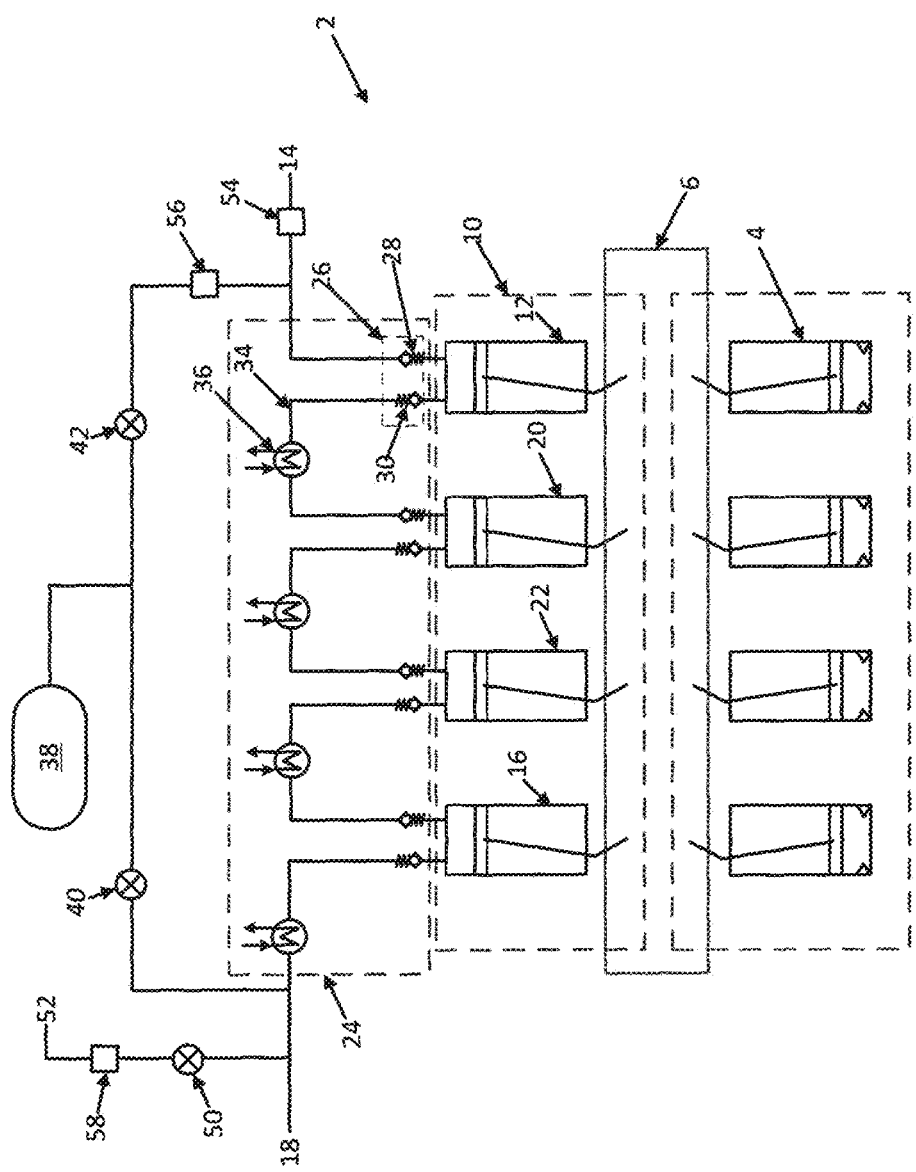
FIG. 4 is a schematic for a four cylinder gas compression system in accordance with the present invention to remove gas by burning it in the engine.

FIGS. 3 and 4 demonstrate two possible ways of creating a low pressure in accordance with the present invention to reduce the pressure in the gas compressor and thereby removing residual gas from the compressor.

A possible way of creating a low pressure is by using a pump system. FIG. 3 is a schematic for an inventive four cylinder gas compression system including blowdown tank 38 and a pump system 45 directed to blowdown tank 38. Pump system 45 includes blowdown assist pump 44 and check valve 46. Both blowdown assist pump 44 and check valve 46 are disposed between, and in fluid communication with, final compression cylinder 16 and blowdown tank 38.

FIG. 3 demonstrates capturing the residual gas in a blowdown tank and productively using the residual gas in a subsequent compression cycle. At the end of a compression cycle in FIG. 3, valve 42, the gas inlet valve (not shown), and the gas outlet valve (not shown) are closed and valve 40 is opened resulting in the pressure of gas compressor (shown collectively as cylinder head 24 and compression cylinders 10 in FIG. 3) equalizing with the pressure of blowdown tank 38. Check valve 46 permits gas to flow passively from compression cylinder 16 into the blowdown tank 38. The pressure of blowdown tank 38 before opening valve 40 depends on whether blowdown tank 38 was vented to the initial compression cylinder 12 after the previous compression cycle, on the pressure set by regulator 56, and on the inlet pressure. For example, if blowdown tank 38 was vented after the previous compression cycle, the pressure in blowdown tank 38 may be the pressure set by regulator 56 or 1 psi above the inlet pressure, e.g., less than or equal to 20 psi, less than or equal to 15 psi, or less than or equal to 10 psi.

After pressure equalization, the pressure of the gas compressor (collectively 10 and 24) and blowdown tank 38 may depend on the total volume of the gas compressor, the volume of blowdown tank 38, and the gas pressure in blowdown tank 38 prior to opening valve 40. For example, the pressure of the gas compressor and blowdown tank 38 may be from 50 psi to 500 psi, from 50 psi to 300 psi, from 50 psi to 200 psi, from 100 psi to 500 psi, from 100 psi to 300 psi, or from 100 psi to 200 psi when the residual pressure is, e.g., 3600 psi.

When the pressure in the blowdown tank 38 becomes equal to that of the residual gas in cylinder 16 (i.e., gas no longer flows through the check valve 46), the blowdown assist pump 44 turns on, thereby increasing the pressure in the blowdown tank 38. This increase in pressure closes check valve 46, preventing backflow into cylinder 16. Blowdown assist pump 44 allows the gas compressor to be further depressurized down to less than 1 psi, less than 5 psi, less than 10 psi, less than 20 psi, less than 50 psi, less than 100 psi, less than 150 psi, less than 200 psi, less than 300 psi, or less than 500 psi. After the gas compressor is further depressurized, the pressure of blowdown tank 38 increases. The amount of the increase would depend on the volume of the gas compressor including the length of piping in the gas compressor, i.e., more piping contains more gas leading to a greater increase in the pressure of blowdown tank 38 compared to less piping. The volume of the gas compressor may be from 2 liters to 100 liters, from 8 liters to 50 liters, or from 2 liters to 30 liters. Valve 40 is closed after depressurization and blowdown assist pump 44 is turned off. It is generally only necessary to run the blowdown assist pump for a short period to achieve the desired depressurization of the gas compressor.

At the beginning of the next compression cycle in the implementation depicted in FIG. 3, valve 42 would be opened to allow blowdown tank 38 to be emptied into initial compression cylinder 12 and recompressed. Valve 40 and 42 may be combined into a single three-way valve such that the single valve would allow no fluid communication to blowdown tank 38, would allow fluid communication between blowdown tank 38 and final compression cylinder 16, or would allow fluid communication between blowdown tank 38 and initial compression cylinder 12.

FIG. 4 is a schematic for a four cylinder gas compression system in accordance with the present invention to purge gas by burning it in the engine. Final compression cylinder 16 is in fluid communication with both gas outlet 18 and engine intake manifold 52 of internal combustion engine 2. Actively actuated valve 50 is disposed between final compression cylinder 16 and gas regulator 58. Gas regulator 58 is disposed between valve 50 and engine intake manifold 52. As shown in FIG. 4, the inventive gas compression system configured to purge gas by engine burning may optionally include a blowdown tank 38 in fluid communication with final compression cylinder 16 and an actively actuated valve 40 disposed between final compression cylinder 16 and blowdown tank 38. When included, blowdown tank 38 may also be in fluid communication with initial compression cylinder 12. Actively actuated valve 42 between initial compression cylinder 12 and blowdown tank 38 regulates the flow of gas between these two vessels.

At the end of a compression cycle in the inventive implementation of FIG. 4, gas inlet and outlet valves (not shown, though connected in a known manner) may be closed and valve 50 may be opened to allow gas to pass from the gas compressor (shown collectively as cylinder head 24 and compression cylinders 10 in FIG. 4) to engine intake manifold 52. While not shown in FIG. 4, engine intake manifold 52 is connected to a fuel supply system that provides fuel to the at least one combustion cylinder 4. It should be understood that engine intake manifold 52 is connected in a typical known manner to the fuel supply system. For clarity however, these details have been omitted. Regulator 58 ensures that the gas pressure from the last compression cylinder 16 does not exceed the fuel rail system pressure (e.g., 100 psi). The engine continues to run, burning residual gas from the gas compressor. The downward motion of the piston of the at least one combustion cylinder creates lower pressure at engine intake manifold 52 to pull the residual gas into intake manifold 52. The low pressure may be from 1 psi to 14 psi, from 4 psi to 12 psi, or from 6 psi to 10 psi. When the pressure of the gas compressor (collectively 20 and 24) is less than 1 psi, less than 5 psi, less than 10 psi, less than 20 psi, less than 50 psi, less than 100 psi, less than 150 psi, less than 200 psi, less than 300 psi, or less than 500 psi, the engine producing the low pressure may be turned off and valve 50 may be closed.

FIG. 4 also shows the option of using blowdown tank 38 to remove residual gas from the gas compressor after a compression cycle. In this embodiment, some of the residual gas may be reintroduced into the next compression cycle instead of being burned. Prior to opening valve 50, valve 40 may be opened to equalize the pressure between the gas compressor and blowdown tank 38.

Valve 40 may then be closed and valve 50 may be opened to burn gas as previously discussed. When the next compression cycle starts, valve 42 would be opened to allow the gas in blowdown tank 38 to be drawn into initial compression cylinder 12 and recompressed as discussed above.

Other Embodiments

While four cylinder gas compressors are exemplified, as few as two cylinders or more than four cylinders may be used without straying from the intended scope of the present invention. Generally, providing more cylinders allows gas to be serially compressed to a higher pressure than would be possible with fewer cylinders.

In some implementations, the compressor may be the internal combustion engine of a vehicle with a modified cylinder head such that the plurality of compression cylinders as described above may be run as combustion cylinders during operation of the vehicle such that all the cylinders of the engine are providing power. Such "on-board" dual-mode compression systems are described in U.S. Pat. No. 9,528,465, the entire disclosure of which is incorporated by reference herein.

The cylinders discussed above operate in series, such that after a cylinder compresses the gas, the gas moves to the next cylinder for further compression. In this implementation, each compression cylinder corresponds to a different compression stage. However, in other implementations two or more of the cylinders may be arranged in parallel, i.e., multiple cylinders compress a gas to a single lower pressure and the gas then moves to another set of multiple compression cylinders (or a single compression cylinder) for further compression, or is routed directly to the gas outlet.

The present invention is not to be limited in scope by the specific embodiments described herein. Indeed, various modifications of the invention in addition to those described herein will be apparent to those skilled in the art from the foregoing description. Such modifications are intended to fall within the scope of the appended claims.

All references cited herein, including all patents, published patent applications, and published scientific articles and books, are incorporated by reference in their entireties for all purposes.

What is claimed is:

1. A gas compression system, comprising:
   (a) a gas compressor including (i) a plurality of compression cylinders in fluid communication with each other and configured to compress a gas in a series of stages, including an initial compression cylinder in fluid communication with a gas inlet and a final compression cylinder in fluid communication with a gas outlet; and (ii) a cylinder head including a valve system to direct a flow of the gas into and out of the compression cylinders; and
   (b) a pump system configured to remove residual gas from the gas compressor after a compression cycle.

2. The gas compression system of claim 1, further including
   (c) a blowdown tank in fluid communication with the final compression cylinder; and
   (d) a valve between the final compression cylinder and the blowdown tank;
   wherein the pump system includes (1) a blowdown assist pump disposed between and in fluid communication with the final compression cylinder and the blowdown tank; and (2) a check valve to admit gas passively to the blowdown tank and to prevent back flow of gas into the plurality of compression cylinders.

3. The gas compression system of claim 1, wherein the volume of the gas compressor is from 2 liters to 100 liters.

4. The gas compression system of claim 2, wherein the blowdown assist pump operates from 10 psi to 500 psi.

5. The gas compression system of claim 1, wherein the plurality of compression cylinders is part of an internal combustion engine.

6. The gas compression system of claim 5, wherein the internal combustion engine further includes at least one standard combustion cylinder to drive the plurality of compression cylinders and a common crankshaft coupling the at least one standard combustion cylinder and the plurality of compression cylinders.

7. A gas compression system, comprising:
   (a) a gas compressor including (i) a plurality of compression cylinders in fluid communication with each other and configured to compress a gas in a series of stages, including an initial compression cylinder in fluid communication with a gas inlet and a final compression cylinder in fluid communication with both a gas outlet and an engine intake manifold of an internal combustion engine; and (ii) a cylinder head including a valve system to direct a flow of the gas into and out of the compression cylinders;
   (b) a valve disposed between the final compression cylinder and the engine intake manifold of the internal combustion engine;
   (c) a blowdown tank in fluid communication with the final compression cylinder; and
   (d) a valve between the final compression cylinder and the blowdown tank.

8. The gas compression system of claim 7, wherein the plurality of compression cylinders is part of the internal combustion engine.

9. A method of removing residual gas from a gas compressor after a compression cycle comprising:
   providing a gas compression system including (a) the gas compressor including (i) a plurality of compression cylinders in fluid communication with each other and configured to compress a gas in a series of stages, including an initial compression cylinder in fluid communication with a gas inlet and a final compression cylinder in fluid communication with a gas outlet; and (ii) a cylinder head including a valve system to direct a flow of the gas into and out of the compression cylinders; and
   creating a low pressure in fluid communication with the final compression cylinder to remove the residual gas after the compression cycle, wherein the pressure of the gas compressor after creating the low pressure is reduced to less than 500 psi.

10. The method of claim 9, wherein the pressure of the gas compressor after creating the low pressure is less than the pressure of the gas compressor after venting the gas compressor to a blowdown tank.

11. The method of claim 9, wherein the pressure of the residual gas in the gas compressor after the compression cycle and prior to creating the low pressure is from 1000 psi to 5000 psi.

12. The method of claim 9, wherein the gas compression system further includes
    (b) a blowdown tank in fluid communication with the final compression cylinder;
    (c) a valve between the final compression cylinder and the blowdown tank;
    (d) a pump system including (1) a blowdown assist pump disposed between and in fluid communication with the final compression cylinder and the blowdown tank; and (2) a check valve to admit gas passively to the blowdown tank and to prevent back flow of gas into the plurality of compression cylinders;
    and wherein creating a low pressure includes: opening the valve between the final compression cylinder and the blowdown tank; and turning on the blowdown assist pump to remove the gas from the gas compressor.

13. The method of claim 12, further including closing the valve between the final compression cylinder and the blowdown tank after the pressure in the gas compressor is reduced to less than 500 psi; and turning off the blowdown assist pump.

14. A method of claim 9, wherein the final compression cylinder is in fluid communication with an engine intake manifold of an internal combustion engine;
    wherein the gas compression system further includes (b) a valve disposed between the final compression cylinder and the engine intake manifold; and
    wherein creating the low pressure includes
       opening the valve between the final compression cylinder and the engine intake manifold; and
       creating a low pressure at the engine intake manifold by running the internal combustion engine.

15. The method of claim 14, wherein the low pressure is from 1 psi to 14 psi.

16. The method of claim 14, further including turning off the internal combustion engine after the pressure in the gas compressor is reduced to less than 500 psi.

17. The method of claim 14, wherein the gas compression system further includes (c) a blowdown tank in fluid communication with the final compression cylinder and (d) a valve between the final compression cylinder and the blowdown tank; and wherein the method further includes prior to opening the valve between the final compression cylinder and the engine intake manifold:

opening the valve between the final compression cylinder and the blowdown tank;

equalizing the pressure between the gas compressor and the blowdown tank; and closing the valve between the final compression cylinder and the blowdown tank.

\* \* \* \* \*